(12) United States Patent
Vogel et al.

(10) Patent No.: US 8,506,004 B1
(45) Date of Patent: Aug. 13, 2013

(54) GAP FAIRING AND DRAG REDUCTION METHOD

(75) Inventors: John Vogel, Columbus, IN (US); Ryan Anthony Reeder, Carmel, IN (US); Barry Alan Minbiole, East Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 13/561,829

(22) Filed: Jul. 30, 2012

(51) Int. Cl.
*B62D 35/00* (2006.01)

(52) U.S. Cl.
USPC .................................................. 296/180.1

(58) Field of Classification Search
USPC ............. 296/180.1, 180.2, 180.4; 105/105.1, 105/1.2, 1.3
IPC ........................................................ B62D 35/00
See application file for complete search history.

(56) References Cited

U.S. PATENT DOCUMENTS

| 3,834,752 | A | | 9/1974 | Cook et al. | |
|---|---|---|---|---|---|
| 4,311,334 | A | * | 1/1982 | Jenkins | 296/180.4 |
| 4,688,841 | A | * | 8/1987 | Moore | 296/180.4 |
| 6,585,312 | B2 | * | 7/2003 | Jain | 296/180.1 |
| 7,617,625 | B2 | * | 11/2009 | Storm | 40/590 |
| 7,712,822 | B2 | * | 5/2010 | Pfaff | 296/180.2 |
| 2011/0109121 | A1 | * | 5/2011 | Salari et al. | 296/180.2 |
| 2012/0126573 | A1 | * | 5/2012 | Minbiole | 296/180.2 |

* cited by examiner

*Primary Examiner* — Glenn Dayoan
*Assistant Examiner* — Pinel Romain
(74) *Attorney, Agent, or Firm* — David M. Rosenblum

(57) ABSTRACT

A gap fairing and aerodynamic drag reduction method for a tractor-trailer. A fairing body is attached to a chassis of the tractor, independently of the cab thereof and within a gap between a cab of the tractor and the trailer. The fairing body has side portions, extending rearwardly from a front portion, adjacent the cab of the tractor, toward the trailer and an upwardly sloping top portion extending to the side portions and terminating in a trailing end. The trailing end can be situated behind the side portions to lessen the inclination of the top portion. A separation space between the front of the fairing body and the cab can be sealed by a sealing element that is at least in part resilient or flexible or both so as to allow relative motion between the fairing body and the cab.

22 Claims, 9 Drawing Sheets

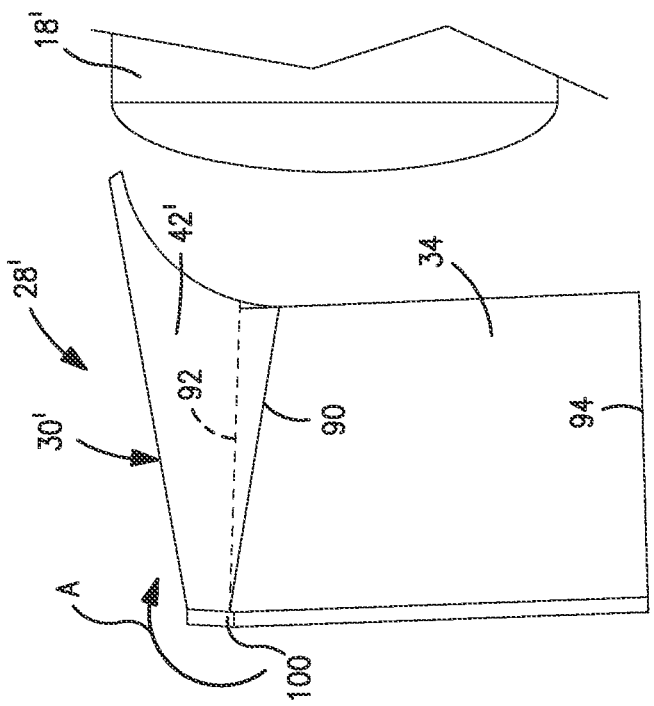
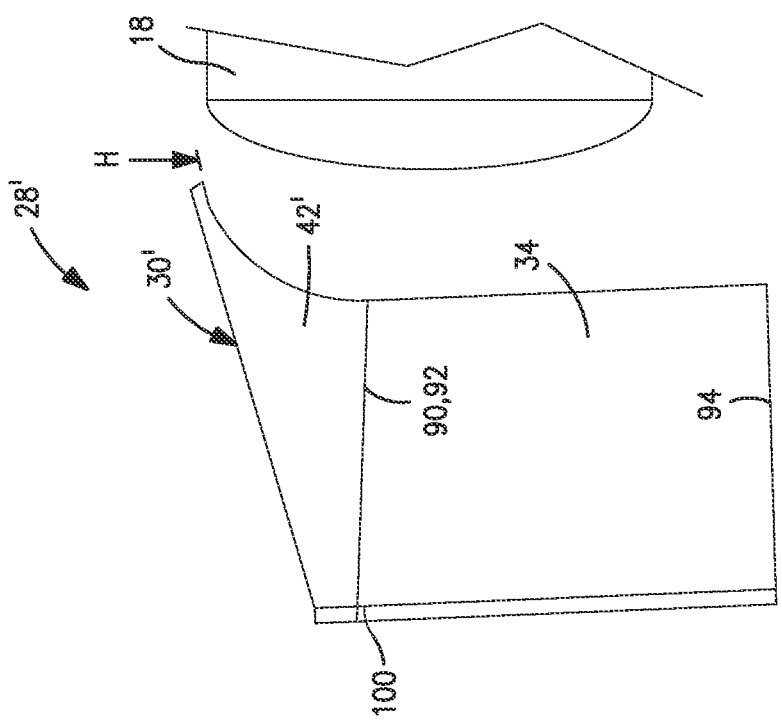

GAP FAIRING AND DRAG REDUCTION METHOD

FIELD OF THE INVENTION

The present invention relates to a gap fairing and drag reduction method for a tractor-trailer in which the gap fairing is mounted in a gap between the tractor and the trailer to reduce aerodynamic drag induced by cross winds that would otherwise enter the gap and to increase streamlining of air flow from a cab of the tractor to the trailer. More particularly, the present invention relates to such a gap fairing and drag reduction method in which the gap fairing is mounted to the chassis of the tractor independently of the cab, a sealing element seals a separation space between the cab and a fairing body of the fairing and an upwardly sloping top portion of the fairing body and terminates in a trailing end located behind side portions of the fairing body to assist in the streamlining.

BACKGROUND

Tractor-trailers are used for over the road transport of goods and other products. Typically, the trailer is pivotably connected to the tractor so that the combination can be maneuvered and with a spacing or "gap" between the tractor cab and the trailer. This gap is a particular source of drag for all tractor-trailers of all cross sectional shapes, including cylindrical tankers such as are used in the industrial gas bulk distribution business, the oil industry and etc.

Aerodynamic drag is a major contributor to fuel consumption, especially at speeds above 50 MPH. Aerodynamic improvements can contribute to fuel savings and provide cost reduction. Fuel consumption reduction also greatly enhances carbon footprint reduction and helps meet additional environmental quality standards and objectives. The gap described above adversely and significantly affects fuel economy. As will be discussed, reducing the size of this gap results in a reduction in fuel consumption of about seven percent.

Tractor-trailers in which a tank is mounted on the trailer are a particular type of bluff body vehicle known to have high drag coefficients. Aerodynamic drag in the gap area is known to be a function of the sub-optimal flow transition from the size and shape of the tractor cab and that of the trailer. The tanker trailer often has a frontal area with air impingement not otherwise deflected by the tractor cab. Also, with the nearly inevitable presence of side wind vectors, the enlarged gap due to the configuration of the tanker trailers allows entry of cross winds and associated forces which also act on the frontal face of the trailer. This resulting flow separation further contributes to increased aerodynamic drag and increased fuel consumption.

Where tractor-trailers are used for transport of liquefied atmospheric gases, these tankers often depart an air separation plant with the maximum over-the-road limited weight. This necessitates adjustments to the effective wheelbase for load distribution among the axles. This required redistribution of the weight tends to require further lengthening of the gap which in turn, additionally increases the aerodynamic drag in that spatial arrangement.

The reduction of drag by enclosing the gap between tractor and trailer with a gap fairing has been recognized in the prior art. In this regard, an example of a current commercially available gap fairing is described in U.S. Pat. No. 3,834,752 which discloses a gap fairing that is sized for the common range of gap distances, from the back plane of the tractor cab to the front plane and arc of swing of the box or van trailers, where the gap distance is markedly shorter than on fully loaded tanker trailers. More recently a gap fairing on an industrial gas bulk liquid delivery tanker has been introduced. This tractor included a "cab-over configuration", still typically used in the United Kingdom and Europe but obsolete in the United States. The gap fairing for this recent design does not include an extended back portion required to optimally achieve maximum gap coverage. The gap fairing is attached to the tractor cab, resulting in the transmission of intended and possibly unintended loads into the very thin tractor cab surface necessitating supplemental structural enhancement. This particular fairing design would require significant modification, tooling, and fitting changes for use with a multitude of tractor sizes, shapes and materials of construction variability.

U.S. Patent Application No. 2011/0109121 discloses a gap fairing that can be used in connection with tractor-trailers having a tank that addresses the size and shape transition, from rectangular cab to cylindrical trailer, as well as consideration of the necessary spacing for tractor-trailer articulation during backing maneuvers. The fairing configuration attaches to the tractor cab, with the attendant imposition of loads on the cab surface and/or structure. This idealized shape, however, has been found by the inventors to represent a costly manufacturing challenge. In addition, the highly conformal fairing-to-cab interface would require significant changes to the design and tooling for a range of tractors with sizes, shapes or materials of construction variations.

As will be discussed the present invention provides a gap fairing for a tractor-trailer and the use of such a gap fairing in reducing drag. Among other advantages of a gap fairing in accordance with the present invention is that such gap fairing is attached directly to the tractor chassis independently of the cab, can be easily adapted for a variety of tractor-trailer designs and can be fabricated in a less expensive manner than gap fairings of the prior art.

SUMMARY

The present invention provides a gap fairing for reducing aerodynamic drag of a tractor-trailer having a tractor and a trailer pivotably connected to the tractor. The gap fairing includes a fairing body attached to a chassis of said tractor, independently of a cab of the tractor, within a gap between a cab of the tractor and the trailer and such that a spacing exists between the fairing body and the trailer to enable the tractor trailer to pivot during maneuvering of the trailer. A front portion of the fairing body is situated directly behind the cab such that also, a separation space exists between a front portion of the fairing body and the cab. The fairing body has side portions, extending rearwardly from the front portion toward the trailer thereby inhibiting cross-winds from entering the gap and assisting in streamlining air flow from the sides of the cab to the trailer and an upwardly sloping top portion connected to at least the front portion, extending to the side portions and terminating in a trailing end, thereby assisting in streamlining air flow from the top of the cab to the trailer. Preferably a seal element seals the separation space between said cab and the fairing body at outer peripheral portions thereof. The seal element, at least in part, has a resiliency or flexibility or both a resiliency and flexibility so as to allow relative motion between said fairing body and said cab. The presence of such a seal element helps to also reduce aerodynamic drag and provide greater comfort for operators of the tractor-trailer. Additionally, with or without the seal element, the top portion can upwardly slope from the front portion of the fairing body so that the trailing end is located behind the side portions. This is a particularly advantageous adaptation in that it enables the top portion to be constructed with a more shallow slope which decreases profile drag that would otherwise exist if a steeper slope were used.

As will be discussed, the gap fairing of the present invention can be constructed utilizing light-weight and simplified construction techniques over prior art designs that incorporate complex aerodynamic shapes. Additionally, the attachment of the fairing body directly to the chassis instead of the cab or the cab and the chassis ensures safety, strength, and security of the fairing body while enhancing the ability to retrofit existing vehicles with such fairings and reducing possible damage to the cab which is costly to repair. The seal element that seals the separation space between the fairing body and the cab at outer peripheral surfaces thereof is advantageous because it will act to also reduce drag and noise produced by air flow rushing over the separation space. In addition, since the tractor cab generally includes a cushioned suspension, allowing it to move independently of the tractor chassis and the fairing body is attached to the chassis, there is relative motion between the cab and fairing body that could damage either of such components. The seal element by having a flexible and/or resilient part allows the separation space to be advantageously sealed while allowing such relative motion. This arrangement of the gap fairing and gap seal reduces risk of damage to the tractor cab during installation, by virtue of attachment of the major portions of the fairing to the more robust tractor chassis rather than to the exposed cab surfaces. It is also to be noted that the economic life of the gap fairing may exceed the economic life or lease duration of the tractor and the attachment of the fairing body to the chassis, rather than the cab, allows such fairing body to be reused by re-retrofitting other vehicles as needed.

As previously discussed, the use of the seal element between the tractor cab and gap fairing serves to enhance drag reduction by providing a blockage that prevents most air flow from entering the separation space between the cab and the gap fairing. The resiliency or flexibility incorporated into the sealing element accommodates the relative motion of the tractor cab, and the chassis mounted gap fairing.

The top portion of the fairing portion can have a central, wedge-like roof section upwardly sloping from the front portion of the fairing body and terminating at the trailing end thereof and two opposed transition sections connecting the central, wedge-like roof section to the side portions. The side portions can be parallel to one another. Alternatively, at least part of the side portions converge toward one another. The transition sections can be formed so as to downwardly curve from the wedge-like roof section to the side portions. In such case, each of the transition sections has an increasing radius of curvature that that gradually increases from the front portion of the fairing body toward the trailing end.

The seal element can cover the outer peripheral portions of said cab and the fairing body and therefore, the separation space and can have a rigid strip attached to the cab and extending around a rear of the outer peripheral portions of said cab. A flexible strip is attached to the rigid strip and rests upon a front of the outer peripheral portions of the fairing body situated at the front portion of the fairing body. In an alternative embodiment, the seal element is a cushion-like member formed of an elastomeric material and located within said separation space. The cushion-like member is configured to extend between a rear of the outer peripheral portions of said cab and the front portion of said fairing body, adjacent to the front of the outer peripheral portions of the fairing body. The cushion-like member includes a front surface attached to and conforming with said rear of the outer peripheral portions of the cab and a rear surface conforming to and in contact with the front portion of the fairing body. In yet another alternative embodiment, the seal element can be formed of a flexible material and can have a "V"-like transverse cross-section having two leg-like sections. One of said leg-like sections is attached to and conforms with a rear of the peripheral portions of the cab and the other of the leg-like section resting upon a front of the peripheral portions of said fairing body situated at the front portion of the fairing body and covers the separation space.

In any embodiment of the present invention, the top portion can be separate from the side portions and hinged to the front portion of the fairing body such that the top portion may be rotated to allow the trailing end of the top portion to be positioned at least substantially level with the trailer. In such case, the fairing body has means for maintaining position of the trailing end of the top portion in place when positioned substantially level with the trailer. Here, "substantially" means within 6 inches vertically.

The present invention further provides a method of reducing aerodynamic drag of a tractor-trailer having a tractor and a trailer pivotably connected to the tractor. In accordance with this aspect of the invention, a fairing body is attached to a chassis of said tractor, independently of a cab of the tractor, within a gap between a cab of said tractor and a trailer of said trailer and such that a spacing exists between the fairing body and the trailer to enable the trailer to pivot during maneuvering of the tractor-trailer. A front portion of the fairing body is situated directly behind the cab and a separation space exists between a front portion of the fairing body and the cab. Cross-winds are inhibited from entering the gap and by provision of side portions of the fairing body that also assist in streamlining air flow from the sides of the cab with side portions of the fairing body extending rearwardly from the front portion toward the trailer. The streamlining air flow from the top of the cab to the trailer is also assisted with an upwardly sloping top portion of the fairing body connected to at least the front portion and extending toward the side portions and terminating in a trailing end. Preferably, such streamlining of the air flow the top portion upwardly slopes from the front portion of the fairing body and terminates in a trailing end located behind the side portions. The separation space is optionally sealed between said cab and the fairing body at outer peripheral portions thereof with a seal element at least in part having a resiliency or flexibility or both a resiliency or flexibility so as to allow relative motion between said fairing body and said cab.

The streamlining of the air flow from the top of the cap to the trailer can be assisted by a central, wedge-like roof section of the top portion that upwardly slopes from the front portion of the fairing body and that terminates at the trailing end thereof and two opposed transition sections of the top portion connecting the central, wedge-like roof section to the side portions. The prevention of cross winds from entering the gap and assisting of the streamlining of the air flow the sides of the cab toward the trailer can be accomplished with side portions arranged in a parallel relationship. In an alternative embodiment, the cross-winds can be inhibited from entering the gap and the air flow streamlined from the sides of the cab toward the trailer with the side portions that are configured such that at least part of the side portions converge toward one another. The streamlining of the air flow from the top of the cap to the trailer can also be assisted by a downward curvature in the transition sections from the wedge-like roof section to the side portions such that each of the transition sections has an increasing radius of curvature that that gradually increases from the front portion of the fairing body toward the trailing end.

The separation space between the cab and the fairing body can be sealed by the seal element by covering said separation space between the cab and said fairing body with the seal element. In such case a rigid strip of the seal element, extending around a rear of the outer peripheral portions of said cab, can be attached to the cab. A flexible strip of the seal element, connected to the rigid strip, rests upon a front of the outer peripheral portions of said fairing body situated at the front portion of the fairing body. In an alternative embodiment, the separation space between the cab and the fairing body can be sealed by positioning a cushion-like member that forms the seal element, within the separation space. The cushion-like member is formed of an elastomeric material and is configured to extend between a rear of the outer peripheral portions of said cab and the front portion of said fairing body, adjacent to the front of the outer peripheral portions of the fairing body. A front surface of the cushion-like member, conforming to said rear of the outer peripheral portions of said cab, can be attached to the rear of the outer peripheral portions of the cab so that a rear surface conforming to the front portion of the fairing body, adjacent the front of the outer peripheral portions thereof is in contact with the front portion of the fairing body. In yet another alternative embodiment, the separation space can best sealed by covering the separation space with the seal element. The seal element is formed of a flexible material and such that the sealing element has a "V"-like transverse cross-section having two leg-like sections. One of leg-like sections can be attached to a rear of the outer peripheral portions of the cab such that the one of the leg-like section conforms thereto and with the other of the leg-like sections resting upon a front of the outer peripheral portions of the fairing body situated at the front portion of the fairing body, thereby covering the separation space.

The top portion of the fairing body can be rotated about a hinge located at the front portion of the fairing body such that the top portion may be rotated to allow the trailing end of the top portion to be positioned at least substantially level with the trailer. The top portion is maintained in place when at least substantially level with the trailer.

BRIEF DESCRIPTION OF THE DRAWINGS

The accompanying drawings, which are incorporated into and form a part of the disclosure, are as follows:

FIGS. 8A and 8B illustrate an alternative embodiment of a fairing body of the present invention that incorporates a top portion that can be pivoted;

DETAILED DESCRIPTION

Figure 1:
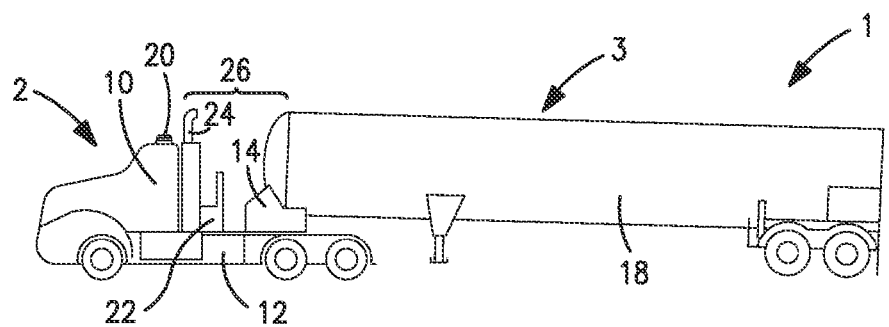
FIG. 1 is a side elevational view of a conventional tractor-trailer without a gap fairing in accordance with the present invention.

With reference to FIG. 1, a conventional tractor-trailer 1 is illustrated that does not include gap fairing in accordance with the present invention. Tractor-trailer 1 has a tractor 2 having a cab 10 mounted on a chassis 12 which contains the engine for the tractor and a cockpit for drivers and passengers. Mounted towards the rear portion of the chassis 12 of the tractor 2 is a king-pin pivot 14 which pivotably connects the trailer 3 to the tractor 2 to allow the tractor-trailer 1 to be maneuvered and turned. The trailer 3 is of the type that mounts a cylindrical tank 18 that can be of circular or oval cross-section to contain liquid products of various types. In addition, the cab 10 includes a GPS antenna dome arrangement 20 as well as an auxiliary hydraulic unit and associated frame 22 An exhaust pipe 24 discharges combustion gases from the tractor engine in a manner such that the fumes are elevated above normal road vehicles traveling near or behind the tractor-trailer 1.

A substantial gap 26 is formed between the cab 10 and the trailer 3. As mentioned above, such gap 26 results in aerodynamic drag being imparted to the tractor-trailer 1 when traveling at highway speed from cross-winds entering the gap. Additionally, there is a geometric mismatch between the rectangular transverse profile of the cab 10 and the cylindrical or oval tank 18 which also will induce aerodynamic drag. The total of such drag on the tractor-trailer 1 results in a decrease in gas mileage and therefore, an increased cost to the fleet operator.

It is to be noted that although trailer 3 is of the type that mounts a cylindrical tank 18; and the invention has been described in connection with such a trailer, this is for exemplary purposes only. The present invention would have equal application to a tractor-trailer incorporating any type of trailer, for example, a van trailer or a dump trailer.

Figure 2:
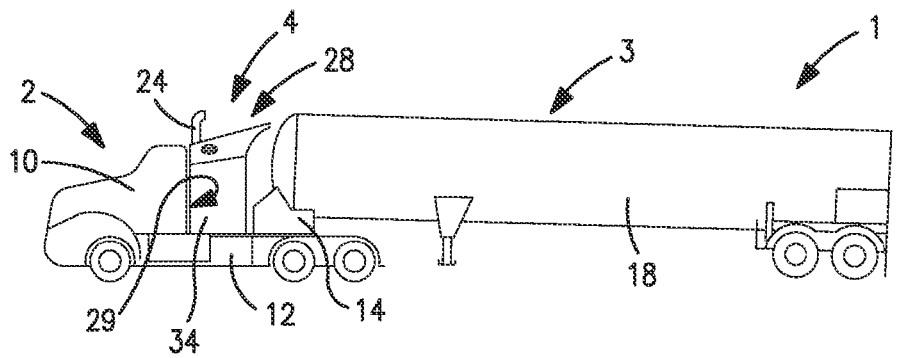
FIG. 2 is a side elevational view of the tractor-trailer illustrated in FIG. 1 with a gap fairing in accordance with the present invention.
Figure 3:
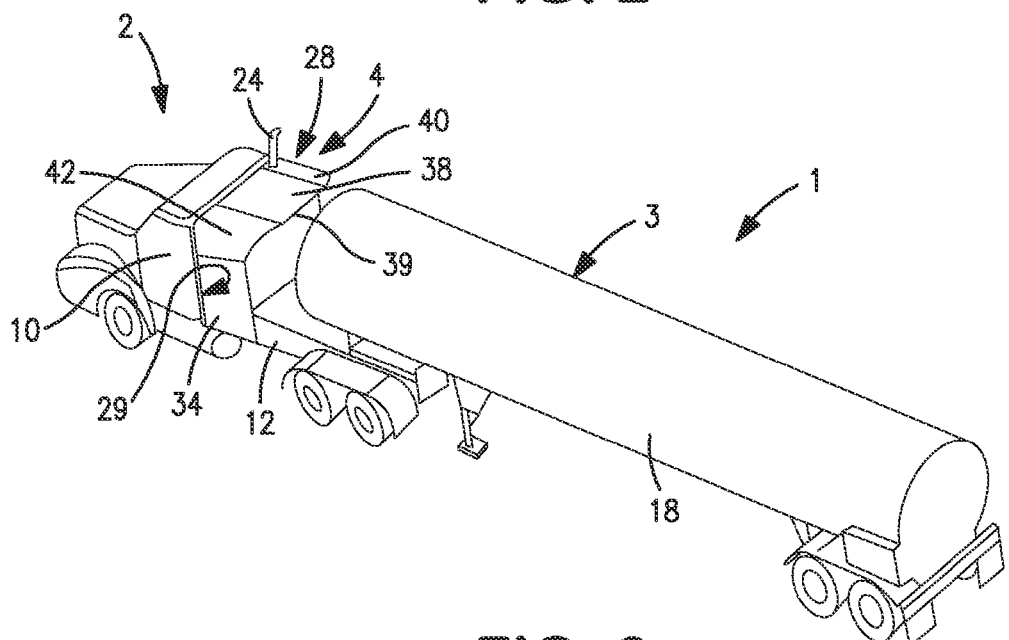
FIG. 3 is a perspective view of the tractor-trailer with gap fairing shown in FIG. 3.

With reference to FIGS. 2 and 3, tractor-trailer 1 is illustrated incorporating a gap fairing 4 in accordance with the present invention. Gap fairing 4 includes a fairing body 28 connected to the chassis 12 and preferably, a gap seal element 29 to seal a separation space 120, illustrated hereinafter in FIGS. 12-14, between the fairing body 28 and the cab 10. The fairing body 28 is located within the gap 26 to help inhibit the effect of cross-winds and to provide a degree of streamlining that will reduce aerodynamic drag due to geometric mismatch between the cab 10 and the tank 18 and a height mismatch due to the fact that the top of front portion 19 of tank 18 is located at a higher elevation than the top of cab 18. Preferably, as will be discussed below, the fairing body 28 is designed such that the GPS antenna dome arrangement 20 is located within the fairing body 28 and the exhaust pipe 24 extends through fairing body 28 in a unimpeded manner. Openings could be provided on both sides of the fairing body 28 depending on the tractor exhaust configuration.

Figure 4:
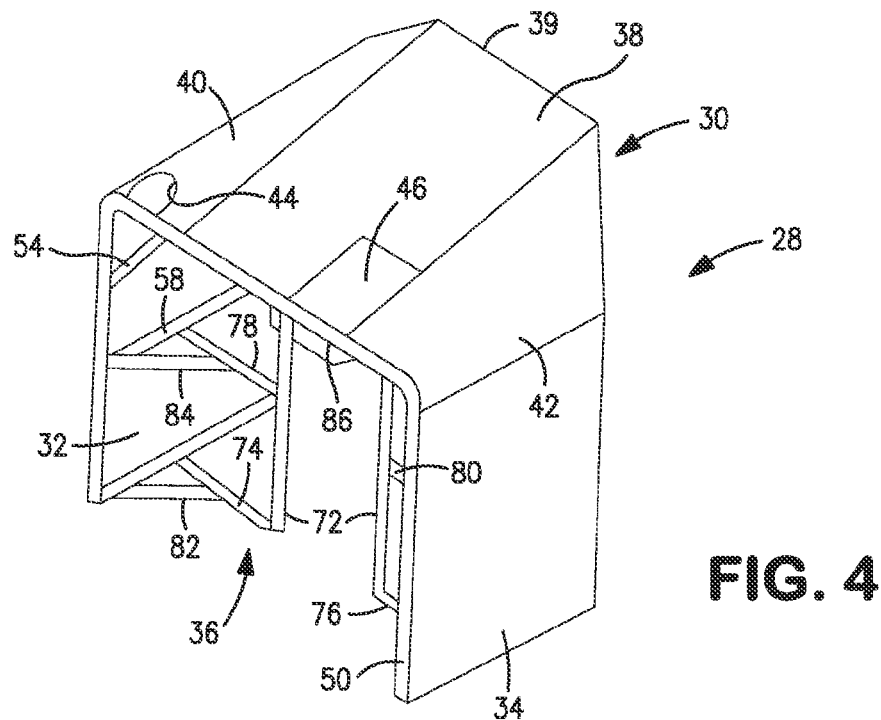
FIG. 4 is a perspective view of a fairing body in accordance with the present invention.

With additional reference to FIG. 4, fairing body 28 has a front portion or leading end formed by a front member 50 of a the frame 36 to be discussed hereinafter that preferably has a cross-sectional size and shape that essentially matches that of the rear portion of the cab 10. Extending rearwardly of the front portion is a top portion 30 and two opposed side portions 32 and 34 that are formed of panels or other covering that are supported by the frame 36. With brief reference to FIG. 3, the back of the fairing body 28 is open, which permits visual inspection, access, illumination, minimized weight, and ventilation including that required for an auxiliary hydraulic unit 22 and the engine exhaust pipe 24. This being said, embodiments of the present invention are possible in which the back of the fairing body 28 is partially or completely closed for such purposes as stiffening of the fairing body 28, aerodynamic improvement, impeding and/or controlling access to the space underneath the fairing body 28. Although not illustrated, the surfaces or trailing end of the fairing body 28 could be provided with supplemental aerodynamic features including; vanes, fins, guides, channels, spoilers or other features to further optimize airflow and minimize aerodynamic drag by providing streamlining capabilities. Moreover, also as not illustrated, hand holds, steps, tie-offs or other features can be incorporated or added to the fairing body 28 enhance accessibility or to provide protection of items transported on the tractor-trailer.

The top portion 30 has a wedge-like roof section 38 that is upwardly inclined from the front of the fairing body 28 and a pair of transition sections 40 and 42 that extend from the wedge-like roof section 38 toward the opposed side portions 32 and 34. The panel forming the transition section 40 is provided with an opening 44 for the exhaust pipe 24 which thereby extends through the firing body 28. The wedge-like roof section 38 is provided with a window 46 formed of fiberglass or other material that allows for transmission of GPS signals to the GPS antenna 20 that is housed within the fairing body 28 and supported by a tray 86 to be discussed. The wedge-like roof section 38 is upwardly inclined from the roof of the cab 10, at or about the height of the cab 10, to a level, at or near the height of the top of the cylindrical tank 18. Preferably the inclination of the wedge-like roof section from the horizontal plane is in a range of at least 5 degrees and preferably no greater than 30 degrees. It is to be noted that the wedge-like roof section 38 presents a planar surface to the air flowing from the cab 10 to the tank 18 to deflect the air over the top of the tank 18 at a front portion thereof. Preferably, the wedge-like roof section 38 extends behind the side portions 32 and 34. In this regard, the wedge-like roof section 38 terminates in a trailing edge 39 that is behind the rear edges of side portions 32 and 34. This extension of the wedge-like roof section allows for a more gradual slope for smooth air flow transition and greater closure of the gap 24, than would be possible without the extension, while maintaining the gap fairing side clearance allowing for at least a 90 degree articulation during back-up maneuvers of the tractor cab and cylindrical trailer combination. For example, if a possible embodiment of the present invention were made with an upwardly sloping roof section positioned at an intermediate location of the top portion 30 that was sized to deflect air over the tank 18, the slope would be more abrupt leading to more aerodynamic drag than the wedge-like roof section 38 due to higher profile drag and turbulence within the larger open area between the fairing body 28 and the tank 18.

While the wedge-like roof section 38 could incorporate a curvature in its upwardly sloping surface, the use of such a planar section has been found by the inventors herein not to significantly increase aerodynamic drag over such a curved section while at the same time can be manufactured more easily and less expensively than a curved design. Furthermore, it is important to note that the position of the wedge-like roof section 38, unlike the prior art, is not provided over the roof the cab, but instead is located behind the cab itself allowing for much lower costs in constructing the gap fairing 4 of the present invention. Moreover, the installation of the gap fairing 4 is far less expensive than prior art designs because, as will be discussed, the fairing body 28 is simply and more directly attached to the chassis 12 in a manner to be discussed.

Figure 5:
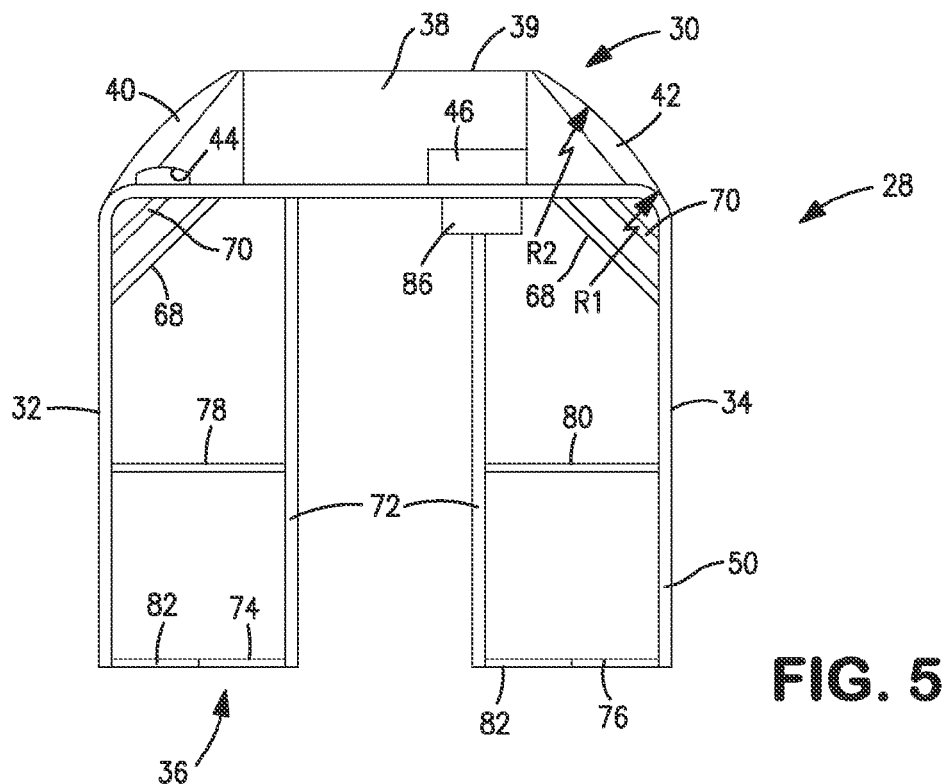
FIG. 5 is a front elevational view of the fairing body shown in FIG. 4.

As can best be seen from FIG. 5, each of the transition sections 40 and 42 preferably have a curved transverse configuration that at the front or leading end of the fairing body 28 has a radius "R1" that is smaller than the radius at the trailing end of the transition sections "R2" for streamlining purposes. Preferably, the radius "R1" can be selected to substantially match the radius between the roof and sides of the cab 10 as shown by "R1", and the radius "R2" can be selected to substantially match the radius of the tank 18 or similar tanks for a greater streamlining effect. Although the transition sections 40 and 42 could be formed of flat plates, the rounded radius configuration is preferred from the aspect of reducing aerodynamic drag by providing aerodynamically streamlined contoured sections that transition from the cab 10 to the tank 18. In this regard the top portion 30 could incorporate a curvature to mimic or approach the shape of the cylindrical tanker trailer. However this would add to the complexity of the fairing body 28 and therefore, the expense in manufacturing the same.

The two opposed side portions 32 and 34 extend from the transition sections 42 and 40, respectively, toward the bottom of the fairing body 28 or when installed, toward the chassis 12. The side surfaces formed by the side portions 32 and 34 are planar. The side portions 32 and 34 extend back as far as practical to minimize the gap 26, but not so far as to interfere with the trailer sides during articulation and backing maneuvers. During these maneuvers, the angle of articulation may exceed 90 degrees. Consideration is given for minimum clearances during combination of articulation and traverse of road irregularities which also affect the relative location of the tanker trailer and the fairing body 28.

The design of the side portions 32 and 34 of the fairing body 28 can also be extended with resilient materials to accommodate contact with the tanker trailer during extreme articulation angles, yet provide the increased benefit of more complete gap elimination. The materials used for extension of the side portions or side panels can be elastomeric and flexible, bristles of a tightly formed brush, hinged rigid, or semi-rigid subsections. Portions or all of the side panels can be made optically transparent to reduce the visibility reduction associated with the gap fairing. The side panels can either end at a level above the cab bottom or below the cab bottom. Any of the surfaces of the gap fairing can be equipped with fixed or actuated openings to dissipate air pressure from a gap fairing-equipped tractor being towed backwards.

The panels forming wedge-like roof section 38, the transition sections 40 and 42 and the side portions 32 and 34 are preferably formed from aluminum. Aluminum sheet formation is particularly advantageous for the transition sections 40 and 42 because such sections preferably incorporate a curvature and the formability of aluminum, or plastic alternatives, allows for smooth transition between this relatively small radius on the leading edge of the transition sections 40 and 42 and the larger radius at the rear of the transition sections 40 and 42. The inherent stability and stiffness of such curved sheets minimizes the need for additional structure, minimizing weight and cost. Other materials of construction could of course be used such as fiberglass or other fiber reinforced polymeric materials and thermoplastics and/or thermoplastic elastomers or other elastomers. In place of panels attached to a frame, the entire fairing body 28 could be integrally formed with an outer covering to provide the desired shape and strength, as with ribs or contoured sections to provide the structural contribution. Alternatively, in place of panel construction, flexible materials such as high performance fabric stretched taught over a framework are possible.

Figure 6:
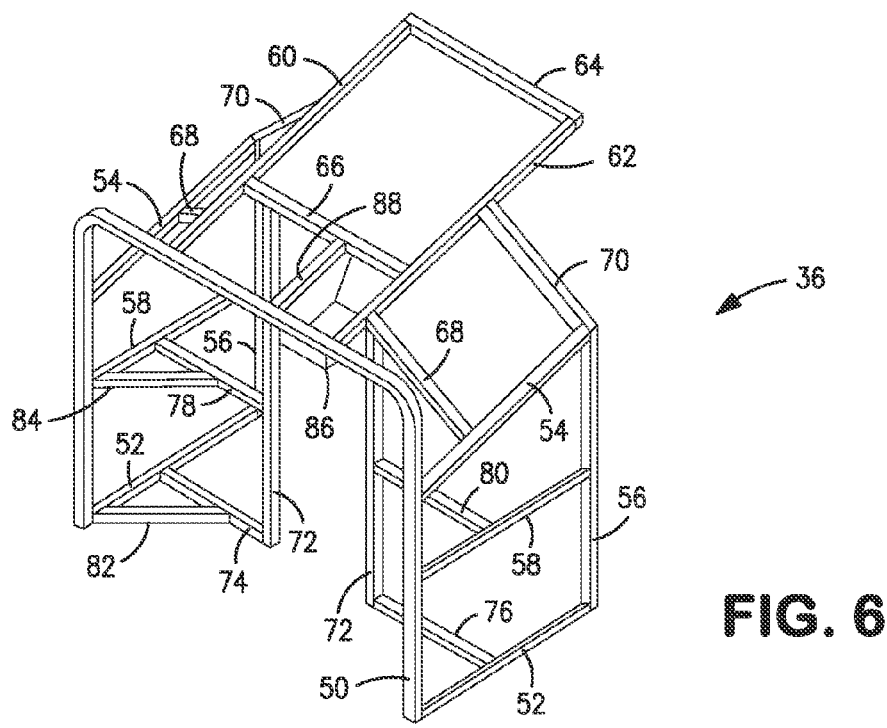
FIG. 6 is a perspective view of a frame of the fairing body shown in FIGS. 4 and 5.

With reference to FIG. 6, the frame 36 preferably incorporates members that are connected in the illustrated space frame that are each formed by aluminum rectangular tubing. Frame 36 is provided with a front member 50 that is shaped into an inverted "U"-like configuration. Support for the panels forming the side portions 32 and 34 is provided by top members 54 that are angled upwardly with respect to bottom members 52 that are in turn connected, at opposite ends, to the front member 50 and rear members 56. Intermediate members 58 are connected at opposite ends to front member 50 and rear members 56. The panel forming the wedge-like roof section 38 is framed by two parallel members 60 and 62 that are connected to the front member 50. An end member 64 and an intermediate member 66 are connected at opposite ends to the two parallel members 60 and 62. The panels forming the transition sections 42 and 40 are supported by side members 54, top members 60 and 62, and front member 50 Further structural integrity is provided for the wedge-like roof section 38 by vertical members 72 that are connected at their top ends to intermediate member 66 and at the bottom by bottom cross-members 74 and 76. Further structural integrity is provided by angled structural members 68 and 70, connecting the wedge-like roof section structure to side members 54. Further strength is provided by pairs of intermediate cross members 78 and 80 that are connected at opposite ends to vertical members 72 and intermediate members 58. Brace-like members 82 are connected at opposite ends to bottom cross-members 74 and 76 and bottom members 52 and intermediate brace-like members 84 are connected to intermediate members 58 and intermediate cross members 78 and 80. A GPS support tray 86 is situated beneath window 46 to support the GPS antenna 20. Support tray 86 is in turn connected to front member 50 and intermediate member 66.

As could be appreciated by those skilled in the art, the construction employed in fabricating the fairing body 28 and its frame 36 are conventional. For instance, the members, discussed above and making up the frame 36 can be attached by welding. The panels covering the frame 36 and forming the top portion 30 and the side portions 32 and 34 can be attached to the frame 36 by such means as pop rivets. Other possible fastening means include adhesive bonding, polymeric welding by heat or solvent, threaded fasteners, hook-and-loop fasteners and interlocking configurations.

Figure 7:
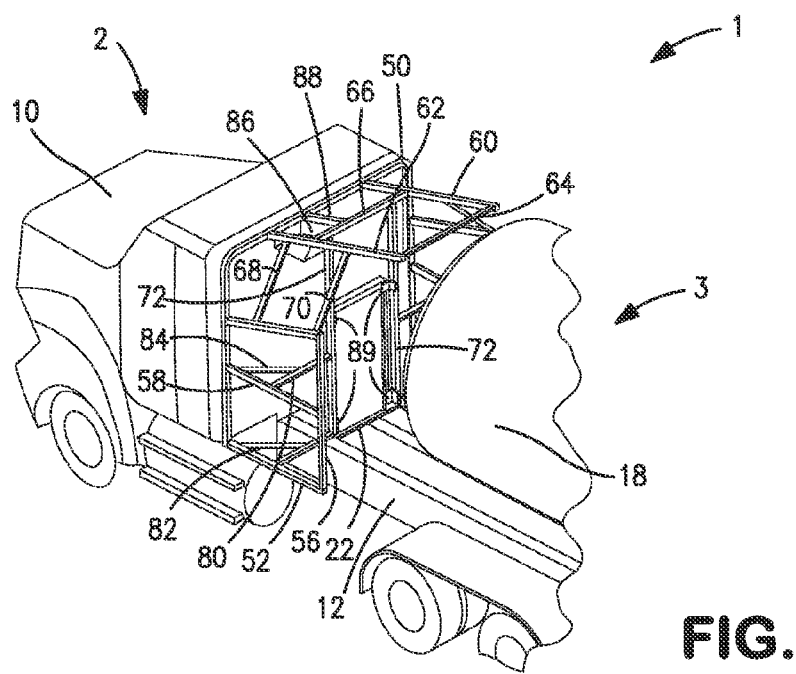
FIG. 7 is a fragmentary, perspective view of the frame shown in FIG. 6 with portions broken away to illustrate a method of attachment of the fairing body of the present invention to a chassis of a tractor.

The fairing body 28 is attached to the chassis 12 by attaching the frame 36 to the chassis 12 by such means as welding, clamping, bolting, pinning or other structurally adequate attachment means. As illustrated, in FIG. 7, such attachment to the chassis is effectuated by means of angle-like brackets 89 that are bolted to vertical members 72 and to the rear portion or frame of the auxiliary hydraulic unit 22 which is in turn connected to the chassis 22. In this fashion, the gap fairing 26 is able to be incorporated into an OEM tractor manufacturer's cab shape and other design features. It is possible to attach frame 36 to the chassis 12 using brackets. These brackets can be structurally shaped plate material clamping the frame 36 to the chassis 12 or other pre-existing structural features on the tractor.

With reference to FIGS. 8A and 8B, a fairing body 28' is illustrated that incorporates a top portion 30' and other structural modifications to the frame 36, discussed above, that is designed to allow a degree of adjustment in the fairing body 28' to enable use of such fairing body with trailers and therefore, tanks 18' of differing height relative to the chassis 12 or size. To such end, the top portion 30' is capable of pivoting motion and is provided with modified transition sections such as 42' that compared to transition section 42 discussed above has a greater height "H". The transition section opposite to transition section 42' incorporates a similar modification to the transition section 40 discussed above. Both of such modified transition sections are also wider than the transition sections 42 and 40 and are provided with a lower edge 90. The side portions, such as the side portion 34' are identical to the side portion 34 or side portion 32 for that matter and the top edge 92 thereof is at the same spacing from the bottom edge 94. This being said, for reasons that will become apparent the spacing between top and bottom edges 92 and 94 could incorporate a different spacing from those of side portions 32 and 34. With reference to FIG. 8A, the top portion 30' is at its uppermost position level with the tank 18. However, where a tank 18' is used that is at a lower height than tank 18 the top portion 30' can be pivoted to accommodate such height. With reference to FIG. 8B, in order to accommodate this lower height, the top portion 30' is pivoted downwardly in the direction "A" and the lower edge 90 of the transition section 42' can be seen to be below the top edge 92 of the side portion 34' which is now enclosed by the transition section 42' due to the overlap.

Figure 9:
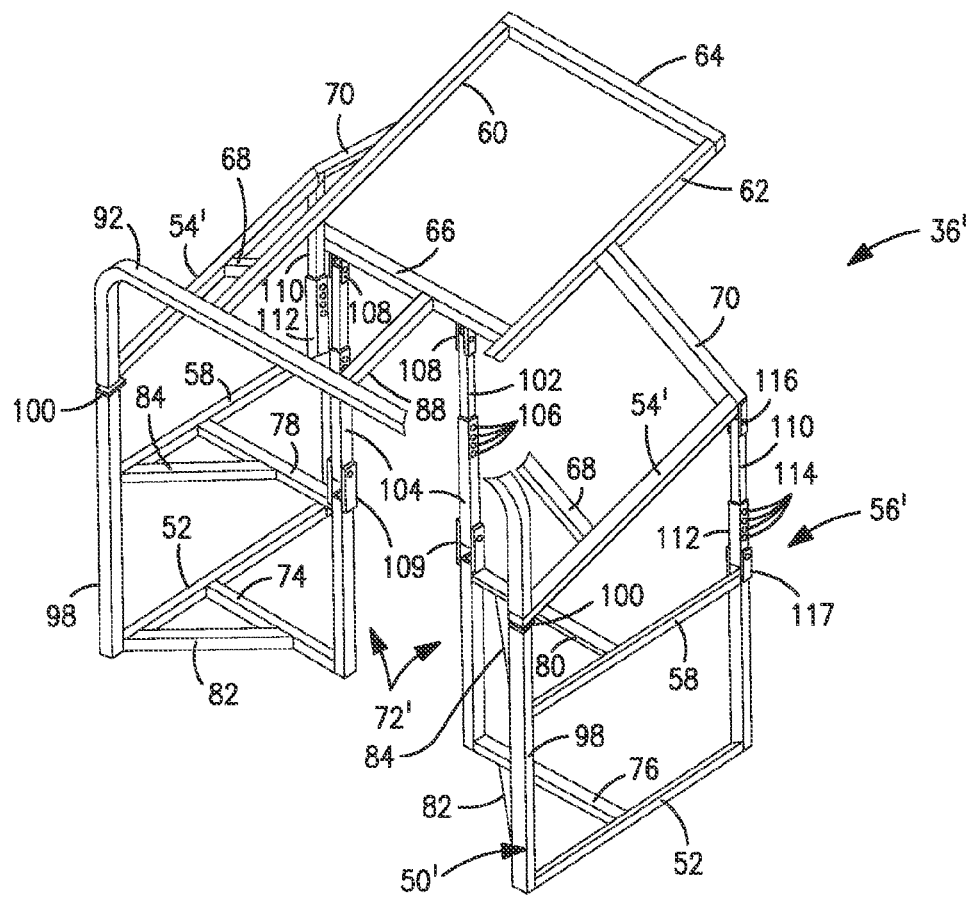
FIG. 9 is an enlarged perspective view of an alternative embodiment of the frame for use in the embodiment shown in FIGS. 8A and 8B with portions broken away.

With additional reference to FIG. 9, a modified version of the frame 36 is illustrated as frame 36' to enable the pivoting motion of the top portion 30'. One such modification is to the front member 50 described above by providing a front member 50' that is split at the legs of its "U" like configuration to form an upper "U" like portion 96 and two lower leg portions 98 which are connected by means of a hinge 100. The upper member 54' of the modified frame, that would be coincident with the lower edge 90 of the transition section 42', is connected, at one end to the resulting upper "U" like portion 96 of the front member 50'. Upper member 54' would in other respects be identical to the upper member 54 described above. This hinge 100 allows for the pivoting motion of the modified top portion 30'. In order to allow such motion while still providing support, frame 36' is also provided of vertical members 72' that are a modification of the vertical members 72, discussed above. Vertical members 72' are telescopic and are provided with a top section 102 telescoped within a bottom section 104. The top and bottom sections 102 and 104 are also provided with a series of holes 106 through which a bolt or pin can be positioned to lock the top and bottom sections 102 and 104 in place. The top section 102 is connected to the intermediate member 66 by a pivotable connection 108. The bottom section 104 is connected to the lower portion of vertical members 72' by means of a pivotable connection 109. Additionally, a further modification incorporated into the frame 36' is to similarly split rear member 56', above intermediate member 58 into a top section 110 telescoped within a bottom section 112. Top and bottom sections 110 and 112 are provided with a series of holes 114 through which a bolt or pin can be extended to lock the sections in place. Top Section 112 is connected to end member 70 by a pivotable connection 116. The bottom section 112 is connected to the remainder of split rear member 56' by means of a pivotable connection 117. The frame 36' is otherwise similar to the frame 36.

Figure 10:
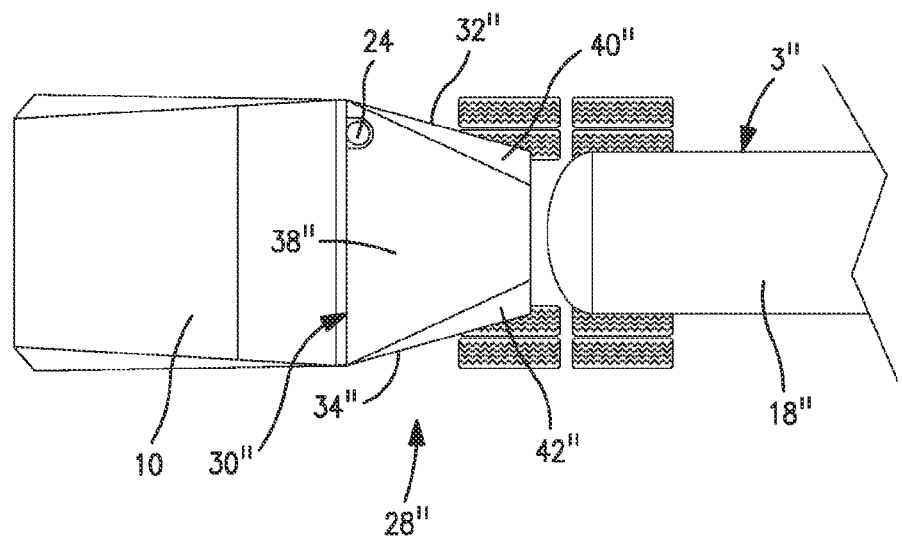
FIG. 10, is a fragmentary top plan view of an alternative embodiment of a fairing body in accordance with the present invention that is installed on the tractor-trailer shown in FIGS. 1 and 2.
Figure 11:
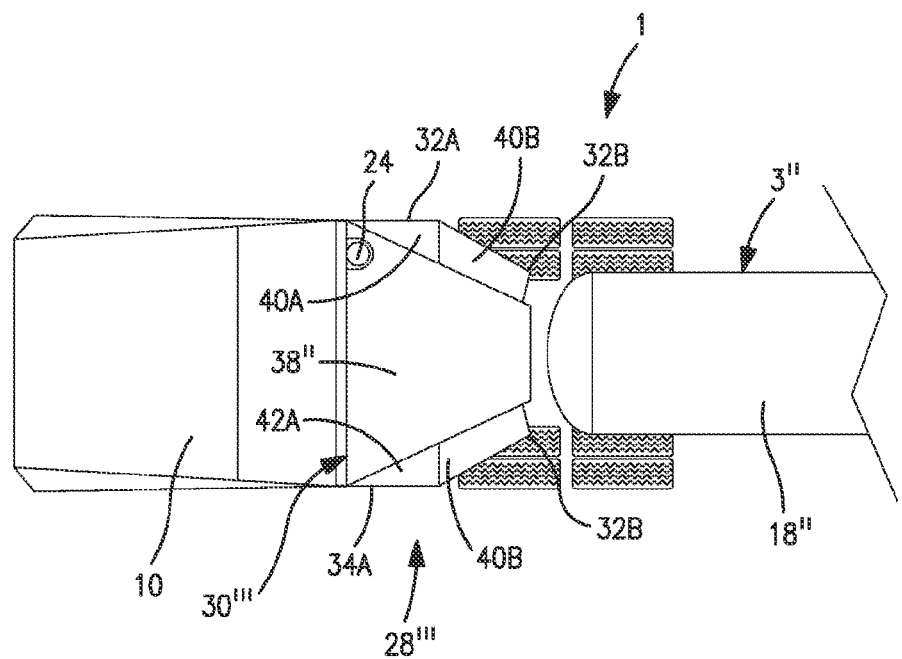
FIG. 11, is a fragmentary top plan view of a further alternative embodiment of a fairing body in accordance with the present invention that is installed on the tractor-trailer shown in FIGS. 1 and 2.

A yet further modification to a fairing body in accordance with the present invention is shown in FIG. 10 in which a fairing body 28" is provided in which modified side portions 32" and 34" are provided that converge towards a tank 18" of smaller diameter than the tank 18 discussed above and mounted on a trailer 3". The top portion 30" is also modified with a tapered wedge-like roof section 38" and modified transition sections 40" and 42" that are narrower than the transition sections 40 and 42 and that extend downwardly from tapered wedge-like roof section 38" to the side portions 32" and 34". A yet further modification to the fairing body is shown in FIG. 11 to accommodate the smaller diameter tank 18" in which a fairing body 28''' is provided with side portions that have two substantially parallel side sections 32A and 34A and two converging end sections 32B and 34B that converge toward the tank 18". The top portion 30''' is modified by providing a set of two transition sections 40A and 420A that extend from the wedge-like roof section 38" (of the same design as that used in the embodiment shown in FIG. 10) toward the substantially parallel side sections 32A and 34A and another set of two transition sections 40B and 420B that extend toward the converging end sections 32B and 34B, respectively. As could be appreciated, the frame supporting such fairing bodies 28" and 28''' would be a modification of the frame 36, discussed above, in a manner known in the art.

Figure 12:
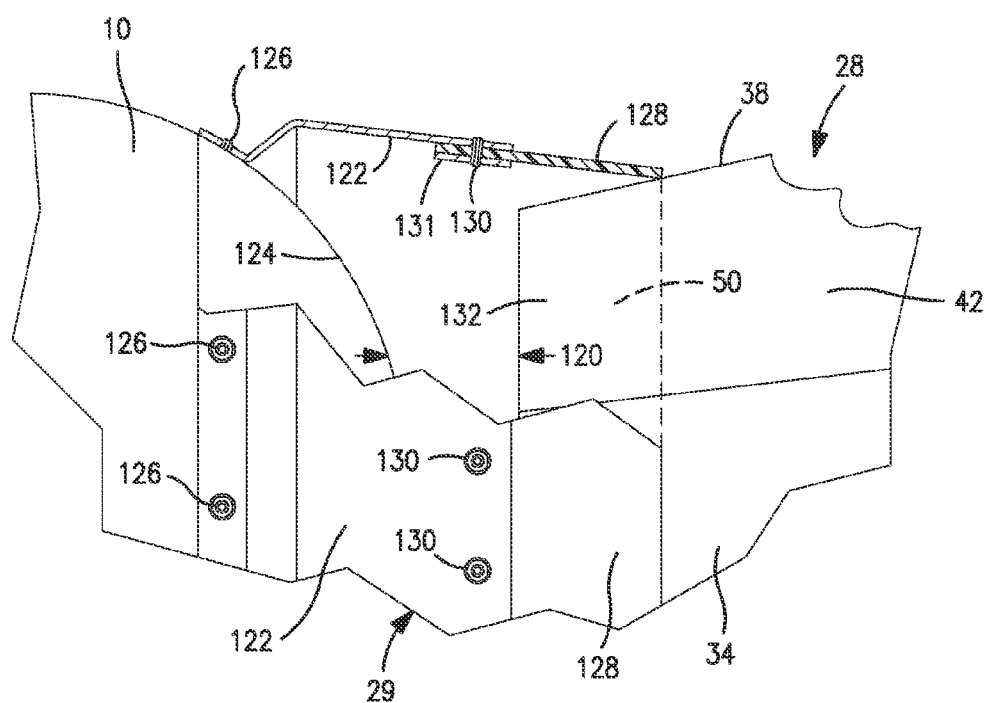
FIG. 12 is an enlarged fragmentary view of a sealing element used in connection with the gap fairing shown in FIGS. 1 and 2 with portions broken away to show a cross-section thereof.

As mentioned above, the independent mounting of the fairing body 28 to the chassis 12 rather than the cab 10 itself is important in that the cab is mounted by a suspension that will isolate the cab 10 from vibration. This leaves a slight separation space 120 between the rear of the cab 10 and the front of the fairing body 28. The seal element 29 has been found by the inventors herein not only to reduce drag as a result of the separation space 120, but also, to reduce noise due to air turbulence that would otherwise be induced by such separation space 120. In order to prevent the transmission of relative motion between the cap 10 and the fairing body 28, the seal element 29 is at least in part flexible or resilient or both flexible and resilient so that such seal element 29 will fill in or cover the separation space 120 but will not transmit forces due to the relative motion. With reference to FIG. 12, seal element 29 is designed to cover the separation space 120 and includes a rigid strip-like element 122, formed of metal or a stiff composite, which extends around a rear peripheral portion 124 of the cab 10. The rigid strip-like element 122 is attached by rivets 126 or other suitable attachment means to the cab 10 such that the rigid strip-like element 122 extends from the cab 10 towards the fairing body 28. The resilient or flexible part of the seal element 29 is provided by a flexible strip-like element 128 that is attached to the rigid strip-like element 122 also by rivets 130 that pass through the rigid strip-like element 122 and the flexible strip-like element 128 and are anchored in place by individual anchoring plates 131. The flexible strip-like element 128 simply rests upon or overlaps the front periphery 132 of the fairing body 28. As illustrated, the cab 10 is slightly higher than the front portion 132 of the fairing body 28 that is situated at the front member 50. The overlap of the flexible strip-like element 128 of the gap seal element accommodates a variable space between the cab 10 and the fairing body 28, allowing less precise positioning of the fairing body 28 on the tractor chassis 12.

Figure 13:
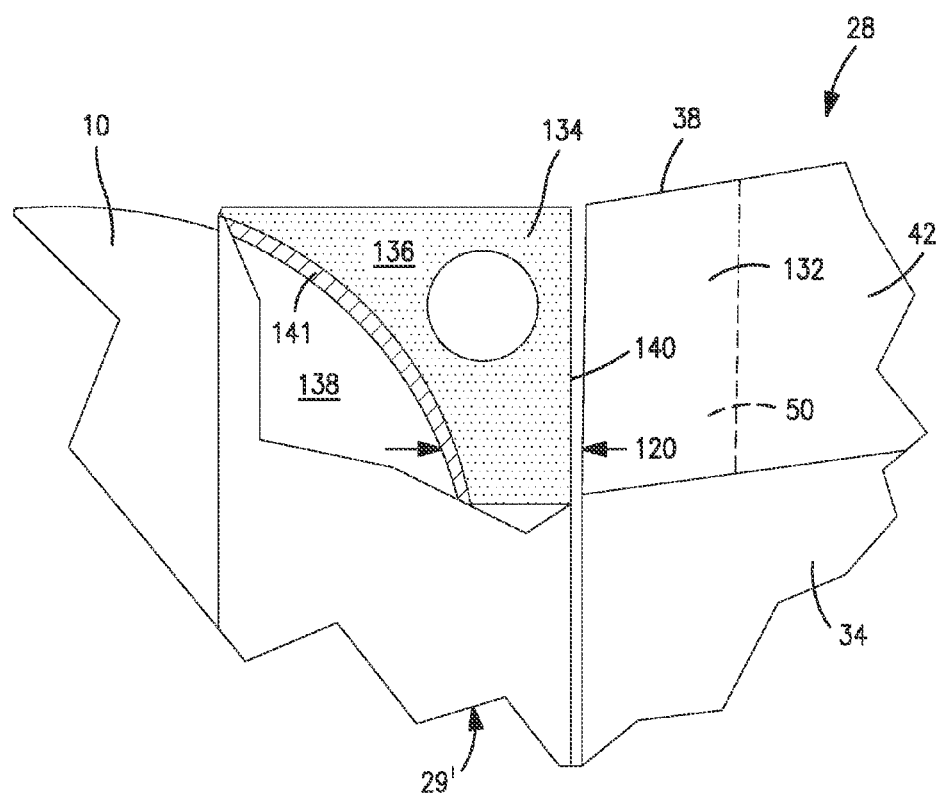
FIG. 13 is an enlarged fragmentary view of an alternative embodiment of a sealing element in accordance with the present invention with portions broken away to show a cross-section thereof.

With reference to FIG. 13, an alternative embodiment of the seal element 29 is illustrated as seal element 29'. Seal element 29' is itself a resilient element in the form of a cushion-like element 134 that is located within the separation space 120 and is configured to extend around a rear peripheral portion of the cab 10 and a front portion of the fairing body. In this regard, the cushion-like element 134 has a front surface 136 that is shaped to conform with the rear peripheral portion 138 of the cab 10 and which as illustrated incorporates a slight curvature. An opposite surface 140 of the cushion-like element 134 is shaped to conform to and contact the front portion 132 of the fairing body 28. The cushion-like member can be formed by an elastomer that may be a molded, extruded, or otherwise solid, cellular, foamed, foamed with a solid skin, or hollow fitted section. The cushion-like element 134 can be attached to the rear peripheral portion of the cab 10 by means of a layer of glue or adhesive 141. The cushion-like element 134 may be a molded, extruded, or otherwise a solid, cellular, foamed, foamed with a solid skin, or hollow fitted section. Although not illustrated, the cushion-like element 134 can be attached to the fairing body 28.

Figure 14:
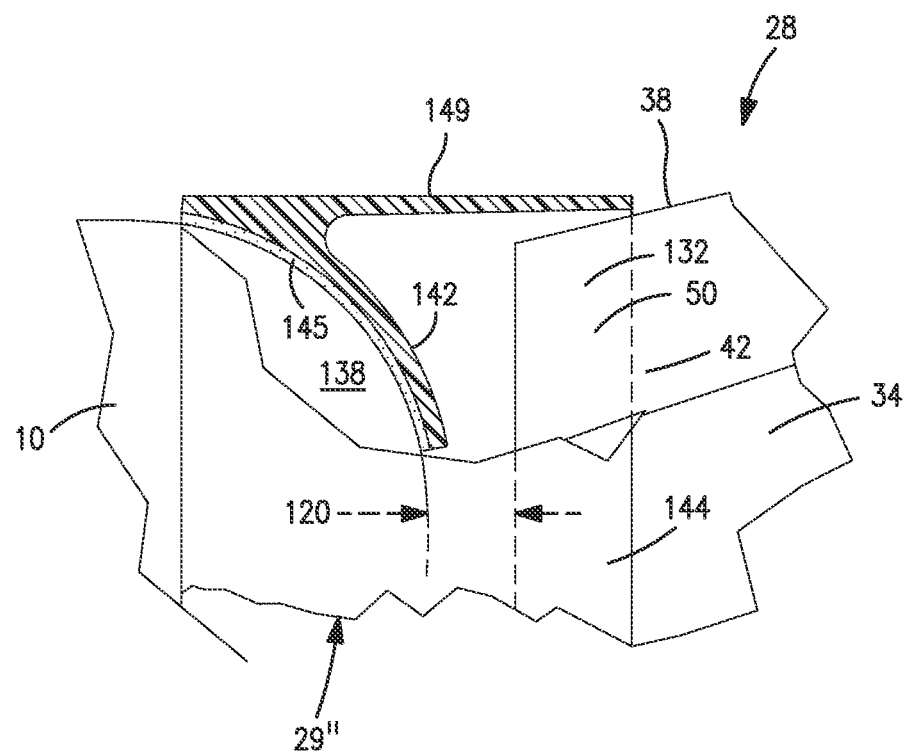
FIG. 14 is an enlarged fragmentary view of a further alternative embodiment of a sealing element in accordance with the present invention with portions broken away to show a cross-section thereof.

With reference to FIG. 14, a yet further alternative embodiment of the sealing element, is illustrated an designated by reference number 29". Sealing element 29" is preferably a rubber extrusion or other extruded material that is both flexible and resilient. As illustrated, it has a "V"-like transverse cross-section having two leg-like sections 142 and 144. Leg-like section 142 is attached to a rear of the peripheral portions of the cab 10 at the peripheral surface 138 thereof by a layer of glue or adhesive 145. Given the flexibility of the leg section 142, it conforms to such peripheral surface 138. The other leg-like section 144 rests upon a front of the peripheral portions of the fairing body 28 situated at the front portion 132 thereof and covering the separation space 120 and enclosing the leg section 142.

While particular embodiments have been described and or illustrated, such are not intended to be limiting. Modifications and changes may become apparent to those skilled in the art, and it is intended that the invention be limited only by the scope of the appended claims.

We claim:

1. A gap fairing for reducing aerodynamic drag of a tractor-trailer having a tractor and a trailer pivotably connected to the tractor, said gap fairing comprising:

a fairing body attached to a chassis of said tractor, independently of a cab of the tractor, within a gap between a cab of said tractor and said trailer and such that a spacing exists between the fairing body and the trailer to enable the trailer to pivot during maneuvering of the tractor-trailer, a front portion of the fairing body is situated directly behind the cab and a separation space exists between a front portion of the fairing body and the cab;

the fairing body having side portion, extending rearwardly from the front portion toward the trailer thereby inhibiting cross-winds from entering the gap and assisting in streamlining air flow from the sides of the cab to the trailer and an upwardly sloping top portion connected to at least the front portion, extending to the side portions and terminating in a trailing end, thereby assisting in streamlining air flow from the top of the cab to the trailer; and a seal element sealing the separation space between said cab and the fairing body at outer peripheral portions thereof and at least in part having at least one of a resiliency and a flexibility so as to allow relative motion between said fairing body and said cab.

2. A gap fairing for reducing aerodynamic drag of a tractor-trailer having a tractor and a trailer pivotably connected to the tractor, said gap fairing comprising:
a fairing body attached to a chassis of said tractor, independently of a cab of the tractor, within a gap between a cab of said tractor and a trailer of said tractor-trailer and such that a spacing exists between the fairing body and the trailer to enable the trailer to pivot during maneuvering of the tractor-trailer, a front portion of the fairing body is situated directly behind the cab and a separation space exists between a front portion of the fairing body and the cab; and
the fairing body having side portions, extending rearwardly from the front portion toward the trailer thereby inhibiting cross-winds from entering the gap and assisting in streamlining air flow from the sides of the cab to the trailer and a top portion, connected to at least the front portion, extending to the side portions, upwardly sloping from the front portion of the fairing body and terminating in a trailing end located behind the side portions thereby assisting in streamlining air flow from the top of the cab to the trailer.

3. The gap fairing of claim 2, wherein the top portion has a central, wedge-like roof section upwardly sloping from the front portion of the fairing body and terminating at the trailing end thereof and two opposed transition sections connecting the central, wedge-like roof section to the side portions.

4. The gap fairing of claim 3, wherein the side portions are parallel to one another.

5. The gap fairing of claim 3, wherein at least part of the side portions converge toward one another.

6. The gap fairing of claim 3, wherein:
the transition sections downwardly curve from the wedge-like roof section to the side portions; and
each of the transition sections has an increasing radius of curvature that that gradually increases from the front portion of the fairing body toward the trailing end.

7. The gap fairing of claim 2, further comprising a seal element sealing the separation space between said cab and the fairing body at outer peripheral portions thereof and at least in part having at least one of a resiliency and a flexibility so as to allow relative motion between said fairing body and said cab.

8. The gap fairing of claim 1 or claim 7, wherein:
said seal element covers said outer peripheral portions of said cab and said fairing body and therefore, the separation space; and
said seal element is a rigid strip attached to said cab and extending around a rear of the outer peripheral portions of said cab and a flexible strip attached to said rigid strip and resting upon a front of the outer peripheral portions of said fairing body situated at the front portion of the fairing body.

9. The gap fairing of claim 1 or claim 7, wherein:
said seal element is a cushion-like member formed of an elastomeric material and located within said separation space, said cushion-like member configured to extend between a rear of the outer peripheral portions of said cab and the front portion of said fairing body, adjacent to the front of the outer peripheral portions of the fairing body; and
said cushion-like member includes a front surface attached to and conforming with said rear of the outer peripheral portions of said cab and a rear surface conforming to and in contact with the front portion of the fairing body.

10. The gap fairing of claim 1 or claim 7, wherein:
said gap seal element is formed of a flexible material and has a "V"-like transverse cross-section having two leg-like sections; and
one of said leg-like sections attached to and conforming with a rear of the peripheral portions of the cab and the other of the leg-like section resting upon a front of the peripheral portions of said fairing body situated at the front portion of the fairing body and covering the separation space.

11. The gap fairing of claim 1 or claim 7, wherein:
the top portion is separate from the side portions and hinged to the front portion of the fairing body such that the top portion may be rotated to allow the trailing end of the top portion to be positioned at least substantially level with the trailer; and
the fairing body has means for maintaining position of the top portion in place when positioned at substantial level with the trailer.

12. A method of for reducing aerodynamic drag of a tractor-trailer having a tractor and a trailer pivotably connected to the tractor:
attaching a fairing body attached to a chassis of said tractor, independently of a cab of the tractor, within a gap between a cab of said tractor and a trailer and such that a spacing exists between the fairing body and the trailer to enable the trailer to pivot during maneuvering of the tractor-trailer, a front portion of the fairing body is situated directly behind the cab and a separation space exists between a front portion of the fairing body and the Cab;
inhibiting cross-winds from entering the gap and assisting in streamlining air flow from the sides of the cab with side portions of the fairing body extending rearwardly from the front portion toward the trailer;
assisting in streamlining air flow from the top of the cab to the trailer with an upwardly sloping top portion of the fairing body connected to at least the front portion and extending toward the side portions and terminating in a trailing end; and
sealing the separation space between said cab and the fairing body at outer peripheral portions thereof with a seal element at least in part having at least one of a resiliency and a flexibility so as to allow relative motion between said fairing body and said cab.

13. A method of reducing aerodynamic drag of a tractor-trailer having a tractor and a trailer pivotably connected to the tractor comprising:
attaching a fairing body attached to a chassis of said tractor, independently of a cab of the tractor, within a gap between a cab of said tractor and a trailer and such that a spacing exists between the fairing body and the trailer to enable the trailer to pivot during maneuvering of the tractor-trailer, a front portion of the fairing body is situated directly behind the cab and a separation space exists between a front portion of the fairing body and the cab;
inhibiting cross-winds from entering the gap and assisting in streamlining air flow from the sides of the cab with side portions of the fairing body extending rearwardly from the front portion toward the trailer; and
assisting in streamlining air flow from the top of the cab to the trailer with a top portion connected to at least the front portion and extending toward the side portions and upwardly sloping from the front portion of the fairing body and terminating in a trailing end located behind the side portions.

14. The method of claim 13, wherein the streamlining of the air flow from the top of the cap to the trailer is assisted by a central, wedge-like roof section of the top portion that upwardly slopes from the front portion of the fairing body and that terminates at the trailing end thereof and two opposed transition sections of the top portion connecting the central, wedge-like roof section to the side portions.

15. The method of claim 14, wherein the cross-winds are inhibited from entering the gap and streamlining of the air flow the sides of the cab toward the trailer is assisted with side portions arranged in a parallel relationship.

16. The method of claim 14, wherein the cross-winds are inhibited from entering the gap and streamlining of the air flow the sides of the cab toward the trailer is assisted with the side portions that are configured such that at least part of the side portions converge toward one another.

17. The method of claim 14, wherein the streamlining of the air flow from the top of the cap to the trailer is also assisted by a downward curvature in the transition sections from the wedge-like roof section to the side portions such that each of the transition sections has an increasing radius of curvature that that gradually increases from the front portion of the fairing body toward the trailing end.

18. The method of claim 13, further comprising sealing the separation space between said cab and the fairing body at outer peripheral portions thereof with a seal element at least in part having at least one of a resiliency and a flexibility so as to allow relative motion between said fairing body and said cab.

19. The method of claim 12 or claim 18, wherein the separation space between the cap and the fairing body is sealed by the seal element by covering said separation space between said cab and said fairing body with the seal element, attaching a rigid strip of the seal element, extending around a rear of the outer peripheral portions of said cab, to said cab and resting a flexible strip of the seal element, connected to the rigid strip, upon a front of the outer peripheral portions of said fairing body situated at the front portion of the fairing body.

20. The gap fairing of claim 12 or claim 18, wherein the separation space between the cab and the fairing body is sealed by:

positioning a cushion-like member that forms the seal element, within the separation space, the cushion-like member formed of an elastomeric material and configured to extend between a rear of the outer peripheral portions of said cab and the front portion of said fairing body, adjacent to the front of the outer peripheral portions of the fairing body; and attaching a front surface of the cushion-like member, conforming to said rear of the outer peripheral portions of said cab, to the rear of the outer peripheral portions of the cab so that a rear surface conforming to the front portion of the fairing body, adjacent the front of the outer peripheral portions thereof is in contact with the front portion of the fairing body.

21. The method of claim 12 or claim 18, wherein the separation space is sealed by:

covering the separation space with the seal element, the seal element formed of a flexible material and such that the sealing element has a "V"-like transverse cross-section having two leg-like sections; and attaching one of leg-like section of to a rear of the outer peripheral portions of the cab such that the one of the leg-like section conforms thereto and with the other of the leg-like sections resting upon a front of the outer peripheral portions of said fairing body situated at the front portion of the fairing body, thereby covering the separation space.

22. The method of gab fairing of claim 12 or claim 18, wherein:

the top portion is rotated about a hinge located at the front portion of the fairing body such that the top portion may be rotated to allow the trailing end of the top portion to be positioned at least substantially level with the trailer; and maintaining the top portion in place when at least substantially level with the trailer.

\* \* \* \* \*